United States Patent [19]

Provenzano et al.

[11] Patent Number: 5,151,407
[45] Date of Patent: Sep. 29, 1992

[54] METHOD OF PRODUCING BI-SR-CA-CU-O SUPERCONDUCTING MATERIALS IN CAST FORM

[75] Inventors: Virgil Provenzano, Bethesda, Md.; Anand K. Singh, Middletown, N.J.; M. A. Imam, Annandale, Va.; Kuntimadi Sadananda, Springfield; William F. Henshaw, Lorton, both of Va.

[73] Assignee: The United States of America as represented by the Secretary of the Navy, Washington, D.C.

[21] Appl. No.: 489,313

[22] Filed: Feb. 28, 1990

[51] Int. Cl.$^5$ .................. C01F 11/02; C01G 3/02; C01G 29/00; C04B 35/60
[52] U.S. Cl. .................................. 505/1; 423/604; 423/617; 423/635; 505/739; 505/782
[58] Field of Search .................... 505/1, 739, 782; 423/604, 617, 635

[56] References Cited

U.S. PATENT DOCUMENTS

| 4,568,650 | 2/1986 | Coblenz et al. |
| 4,826,808 | 5/1989 | Yurek et al. |
| 4,892,861 | 1/1990 | Ray ............................... 505/785 |
| 5,047,391 | 9/1991 | Bock ............................. 505/1 |

FOREIGN PATENT DOCUMENTS

| 0304061 | 8/1988 | European Pat. Off. |
| 0056317 | 3/1989 | Japan ......................... 505/739 |
| 0290531 | 11/1989 | Japan ......................... 505/782 |

OTHER PUBLICATIONS

Baughman, "Melt Processing Ceramic YBa$_2$Cu$_3$O$_x$", MRS Ext. Abst.: High-Temp Super. II, Apr. 5-9, 1988, pp. 341-344.
Bock "Preparation of Single Phase 2212 Bismuth Strontium Calcium ... ", Solid State Comm vol. 72(5), 1989, pp. 453-458.
A. D. Berry et al., "Formation of High T Superconducting Films by Oganometallic Chemical Vapor Deposition", Extended abstract from a poster session during the Apr. 5 through 9, 1988 syposium on High Temperature Superconductors II, Reno, Nev., pp. 141-143.
Jin et al., "Superconductor Wire by Molten Oxide Processing", Appl. Phys. Lett 51(12, 21 Sep. 1987, pp. 943-945.
Khurana, "Super Collider Magnet-Program Pushes Toward Prototype", Physics Today, Apr. 1988, pp. 17-85.
Das et al., "Casting High-T$_c$ Superconducting BiSCCO", printed in Journal os Superconducting, vol. 2, No. 2, 1989, pp. 253-263.
Provenzano et al., "Preliminary Studies for the Development of Superconducting Composite Wires", printed in IEEE Transactions on Magnetics, vol. 25, No. 2, Mar. 1989, pp. 2320-2322.

Primary Examiner—Paul Lieberman
Assistant Examiner—John Boyd
Attorney, Agent, or Firm—Thomas E. McDonnell; Barry A. Edelberg

[57] ABSTRACT

Bulk form of superconducting materials are produced by pouring a melt a O$_2$-containing superconducting material into a heated mold, cooling the mold until solidification begins, removing the cast object from the mold, gradually cooling the cast object to prevent the development of thermal stresses, and then annealing the cast, cooled object to restore O$_2$ to near equilibrium levels. The bulk form produced according to the present invention may be used as a sputtering target in the production of wires, or as a bulk form semiconductor.

9 Claims, 2 Drawing Sheets

Resistance vs. Temperature of cast Bi-Sr-Ca-Cu-O

METHOD OF PRODUCING BI-SR-CA-CU-O SUPERCONDUCTING MATERIALS IN CAST FORM

BACKGROUND OF THE INVENTION

1. Field of the Invention

The present invention relates generally to the production of superconducting materials and more specifically to the production of superconducting materials in bulk form.

2. Description of the Prior Art

Superconducting materials in bulk form are used as precursors in the fabrication of superconducting films and wires. Because the superconductivity of a film or thin wire can be no better than that of the bulk material from which it was fabricated, persons in the art have sought to produce bulk materials having maximum superconductivity.

The need for bulk materials of high superconductivity increased with the discovery of high $T_c$ superconducting materials. Most of the high $T_c$ superconductors presently known are sintered polycrystalline materials. High current densities have not yet been achieved in sintered polycrystalline material because of extensive porosity. While Hot Isostatic Pressing has produced bulk superconducting materials with near-theoretical density, prior art attempts to produce superconductor materials directly from the melt have been limited, especially in the recently discovered Bi-Sr-Ca-Cu-O system, a member of the perovskite oxide family. Thus, although the art has recognized the need for a simple and convenient method of producing superconductor materials in bulk form, that need went unfulfilled.

Although it is believed not to be prior art with respect to the present invention (based upon the presently known evidence of dates of conception and reduction to practice) the independent work of Das et al (done while employed by the assignee) is similar to that of the present invention. The work of Das et al was published as *Journal of Superconductivity*, Vol. 2, No. 2, (1989) (incorporated herein by reference). Because information disclosed in the Das et al paper may provide useful insights into the present invention, review of that paper is strongly recommended. In addition to providing information concerning practice of the present invention, the Das et al paper also describes the failures of the prior art to successfully cast various superconductors from the melt.

SUMMARY OF THE INVENTION

It is an object of the present invention to overcome the above-mentioned disadvantages of the prior art.

It is another object of the present invention to produce a superconductor material in bulk form in a simple and convenient manner.

It is a further object of the present invention to produce a dense, mechanically strong superconductor material in bulk form without the need for pressing.

It is yet another object of the present invention to produce a dense, mechanically strong superconductor material in bulk form directly from a melt.

These and other objects are accomplished by the present invention. A starting material for a perovskite superconductor is calcined, finely ground and mixed. The mixed starting material is then heated sufficiently to produce a molten pourable liquid. The molten starting material is then poured into a mold. Once the material begins to solidify, it is removed from the mold and allowed to cool at room temperature. Then, the cast material is annealed in air at an elevated temperature. The annealed material is then quenched.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENT(S)

Figure 1:
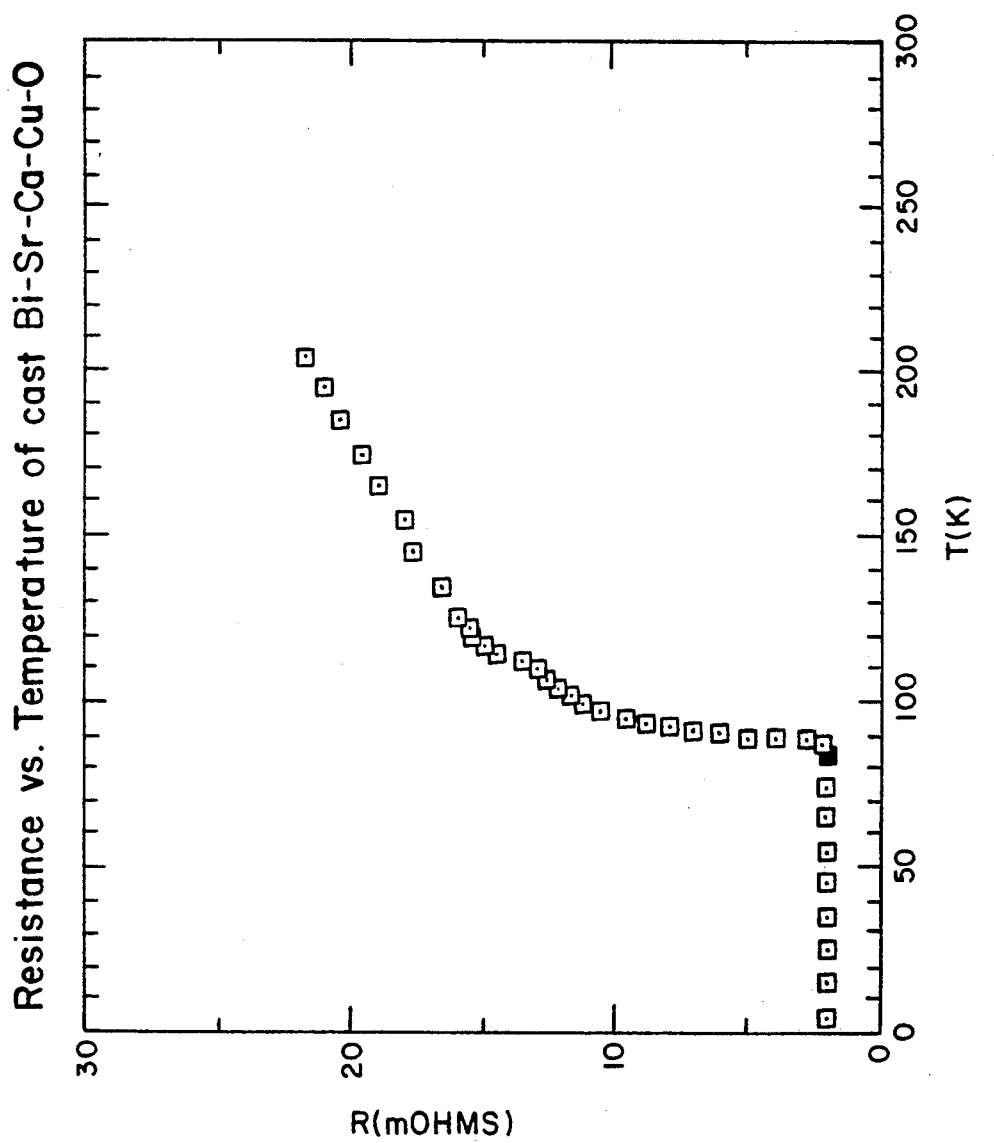
FIG. 1 is a graph of resistance vs. temperature of cast Bi-Sr-Ca-Cu-O.

The present invention can be applied to the production of bulk forms of virtually any sinterable superconducting perovskite. Preferably, however, the invention is applied to the production of bulk forms of superconducting bismuth-containing perovskites. All known cuprate superconductors are perovskites. Usually the starting material is a mixture of various oxides. The ratio of the components in the mixture should be selected to provide the optimum superconductivity for the selected material. These optimum ratios are known and do not constitute part of the present invention. For example, the optimum atomic ratio for a mixture of $Bi_2O_3$, $SrCO_3$, $CaCO_3$ and CuO (hereinafter referred to as BISCCO) is 2:2:2:3.

Likewise, calcining is known. The starting material is preferably calcined at or near the temperature known to be optimum for that composition. For the BISCCO composition described above, the calcining temperature is preferably about 700° C. to 800° C. As recognized by the art, grinding the starting material to a suitable size range (usually averaging about 10 to 20 $\mu$m) after calcining enhances mixing and causes mixing per se.

After calcining, the ground and mixed starting material is heated, usually in an air furnace (although any furnace capable of achieving the required temperature may be used), to a temperature at which they melt into a pourable liquid. During heating, the starting material is maintained within a container which is inert to the starting material and which does not decompose or melt at the required temperatures. A platinum crucible is an example of a suitable container, although other containers, such as one made of spinel may be used. During the subsequent pouring step, the melted starting material must not cool to the extent that its viscosity significantly increases. A significant viscosity increase during pouring would prevent successful completion of pouring. Therefore, in the heating step, the starting material is preferably heated to the highest temperature at which significant decomposition or vaporization does not occur.

After heating, the molten material is removed from the furnace and poured into heated molds to avoid thermal shock. The mold should be preheated to a temperature which avoids thermal shock when contacted with the hot molten material, but should be below a temperature at which the mold reacts with the molten material. For copper molds, the molds are preferably preheated to about 600°±50° C. The mold shapes the object into the desired form. Preferably, the mold has a coefficient of thermal expansion significantly different from that of the starting material. Thus, during cooling, the starting material will not stick to the mold. For example, when the starting material is the above-described BISCCO the mold may be copper. If needed, the inner surface of the mold can be passivated by coating it with a non-reactive passivating layer of, e.g., MgO. The passivating layer should, of course, be as thin as reasonably possible to prevent thermal stresses resulting from differing coefficients of thermal expansion. Those skilled in the art should be capable of providing an appropriate passivation layer for the present invention without undue experimentation or the exercise of inventive faculties.

Once the material begins to solidify, it is removed from the mold and permitted to cool to about room temperature (i.e., about 15° C. to 35° C.) in stages to avoid a thermal shock which might otherwise cause cracking or result in a brittle, unusable solid. The particular method of cooling is not critical. Preferably, cooling is performed in two or three steps. For BISCCO, the cast material may be initially quenched to 800° C. to 900° C., until it equilibrates, and then air cooled to room temperature. The cast material may also be furnace cooled.

The cast and cooled material is then annealed for several hours at an elevated temperature in an oxygen-containing atmosphere such as air. The time and temperature of the annealing process should be adjusted, according to the starting material, so that annealing replenishes the $O_2$ in the material lost during calcining, melting and casting to a near equilibrium level of oxygen. At lower than optimum temperatures, the cast material will either not recover oxygen or will recover oxygen at an impracticaly slow rate. At temperatures above the optimum range, the cast material begins to lose oxygen. For the above-mentioned BISCCO starting material, the anneal should proceed for at least ten hours at about 800° C. to 900° C., preferably 850° C.

After annealing, the cast material is quenched. Quenching freezes the internal structure of the cast material. The cast structure must be quenched in a manner which freezes its internal structure, but is preferably done in stages similar to the pre-anneal cool down so that no significant internal stresses develop. The development of cracks and internal stresses is less likely in post-anneal quenching rather than pre-anneal quenching and therefor, the need for control over the speen of quenching is greater pre-anneal than post anneal.

The present invention generally provides bulk forms of superconductors. The present process can produce molded tubes and rods of semiconductors, provided, of course, that the molds required to produce those shapes have internal cross sections large enough to permit pouring of the molten superconductor material therein. Also, once produced, the bulk forms can be used as sputtering targets in the production of thin wires and films.

Although it is not intended to be bound by theory, it is believed that the present invention provides excellent superconducting materials by restoring, during secondary (final) annealing, oxygen lost from the material in casting. The process of the present invention may be used to produce bulk forms of any perovskite superconducting material whose superconducting properties are not lost during the casting process to the extent that secondary annealing cannot restore the superconducting properties without destroying the bulk form of the material obtained by casting.

Having described the invention, the following examples are given to illustrate specific applications of the invention including the best mode now known to perform the invention. These specific examples are not intended to limit the scope of the invention described in this application.

Figure 2:
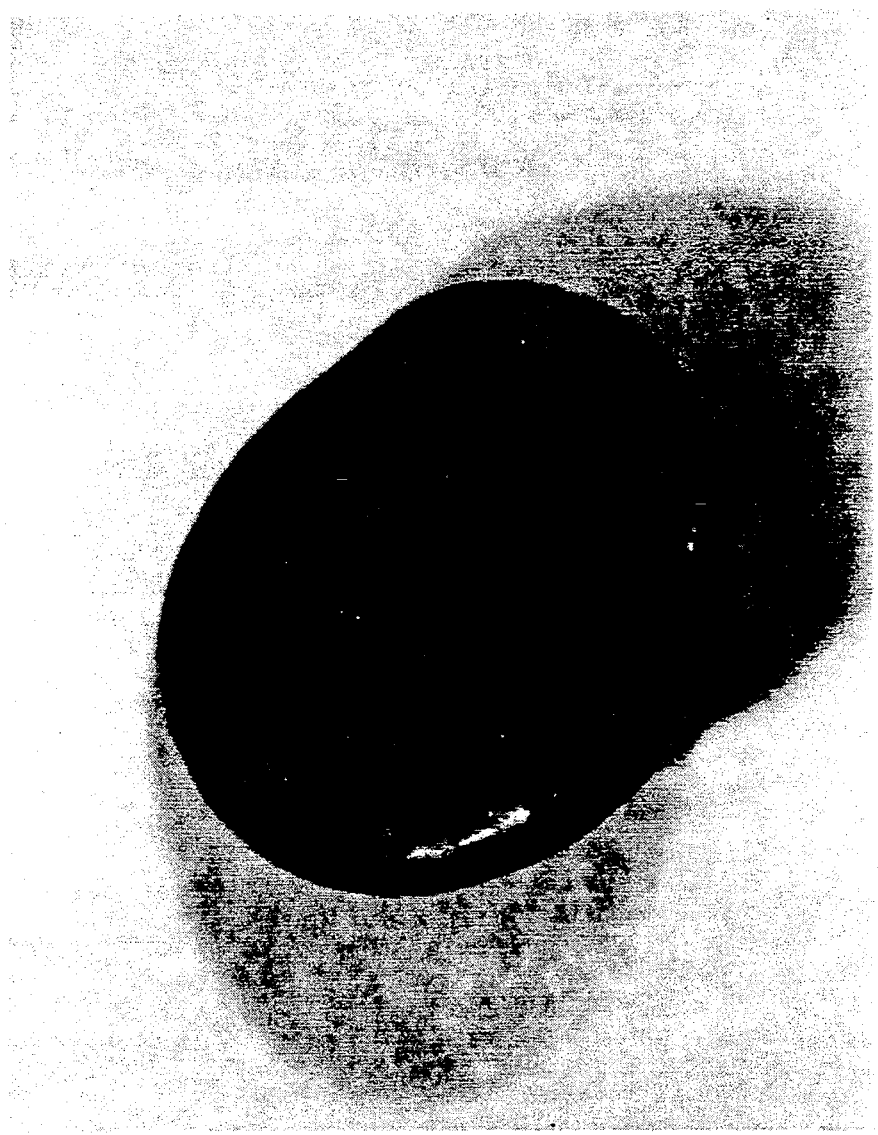
FIG. 2 is a 1.5 inch diameter superconducting Bi-Sr-Ca-Cu-O bulk disk material prepared by casting according to the present invention.

EXAMPLE $Bi_2O_3$, $SrCO_3$, $CaCO_3$, and CuO powders were mixed in the atomic ratio of 2:2:2:3 and then calcined in a furnace at 750° C. for eight hours. The calcined powders were finely ground and mixed by mortar and pestle. The ground and mixed calcined powders were placed inside a platinum crucible. The crucible with the powders was placed inside and air furnace and the temperature of the furnace raised to 1200° C. At this temperature, the mixture became molten. The molten mixture was removed from the furnace and poured into copper molds. When the material began to solidify, it was removed from the molds and allowed to cool to room temperature. Subsequently, the cast samples were annealed for several hours in air at 850° C. and then air quenched to room temperature. The resistivity of the thus produced materials was then measured. These measurements clearly showed that the superconducting properties were close to the optimum achievable with the starting material used (see FIG. 1). FIG. 2 shows the structure of the cast and annealed material.

The present invention advantageously makes bulk forms of superconducting material by a simple casting technique. Moreover, the method is quite fast and can be used to make bulk material in virtually any desired shape.

Obviously, many modifications and variations of the present invention are possible in light of the above teachings. It is therefore to be understood that, within the scope of the appended claims, the invention may be practiced otherwise than as specifically described.

What is claimed is:

1. A method of producing a superconducting material in bulk form, comprising the steps of:
   heating a powder of a starting material for a perovskite superconducting material to a temperature at or above which it forms a pourable liquid, but below the decomposition or boiling point of said liquid;
   casting a bulk form of said superconducting material by pouring said liquid into a mold, maintaining said liquid in said mold until said liquid begins to solidify to a hot, cast object, removing said hot, cast object from said mold and cooling said hot, cast object to room temperature at a rate sufficiently slow to prevent the embrittlement or cracking of said cast object; and
   annealing said cooled cast object, said temperature and time of annealing being sufficient to restore the level of $O_2$ in said cooled cast object to near equilibrium levels wherein said superconducting material is the Bi-Sr-Ca-Cu-O system with a 2:2:2:3 atomic ratio.

2. The method of claim 1, wherein said superconducting material is a bismuth-containing perovskite.

3. The method of claim 2, wherein said mold is preheated to about 600°±50° C.

4. The method of claim 2, wherein said superconducting material is a mixture of $Bi_2O_3$, $SrCO_3$, $CaCO_3$ and CuO.

5. The method of claim 2, wherein said mixture comprises $Bi_2O_3$, $SrCO_3$, $CaCO_3$ and CuO in a ratio of 2:2:2:3.

6. A method of producing a superconducting material in bulk form, comprising the steps of:

calcining powders of starting materials for a perovskite superconducting material in bulk form;

finely grinding and mixing said calcined powders;

heating said ground and mixed powders to a temperature at or above which they from a pourable liquid, but below the decomposition or boiling point of said liquid;

casting a bulk form of said superconducting material by pouring said liquid into a mold, maintaining said liquid in said mold until said liquid begins to solidify to a hot, cast object, removing said hot, cast object from said mold and cooling said hot, cast object to room temperature at a rate sufficiently slow to prevent the embrittlement or cracking of said cast object; and annealing said cooled cast object, said temperature and time of annealing being sufficient to restore the level of $O_2$ in said cooled cast object to near equilibrium levels wherein said superconducting material is the Bi-Sr-Ca-Cu-O system with a 2:2:2:3 atomic ratio.

7. The method of claim 1, wherein said mixture comprises Bi, Sr, Ca, Cu and oxygen.

8. The method of claim 7, wherein said cooling step comprises quenching said hot, cast object to a temperature of 800° C. to 900° C. and then air cooling said quenched object to room temperature.

9. The method of claim 8, wherein said anneal is performed for at least ten hours at a temperature of about 800° C. to about 900° C.

* * * * *